United States Patent [19]
Djiauw et al.

[11] Patent Number: 5,777,031
[45] Date of Patent: Jul. 7, 1998

[54] HIGH 1,2 CONTENT THERMOPLASTIC ELASTOMER/OIL/POLYOLEFIN COMPOSITION

[75] Inventors: Lie Khong Djiauw; Michael John Modic, both of Houston, Tex.

[73] Assignee: Shell Oil Company, Houston, Tex.

[21] Appl. No.: 898,001

[22] Filed: Jul. 25, 1997

Related U.S. Application Data

[63] Continuation-in-part of Ser. No. 675,637, Jul. 3, 1996, abandoned.

[51] Int. Cl.⁶ .............................. C08L 53/02; C08L 9/06; C08L 47/00
[52] U.S. Cl. .................. 525/98; 525/88; 525/95; 525/232; 525/240; 525/241
[58] Field of Search ................... 525/88, 98, 95, 525/232, 240, 241

[56] References Cited

U.S. PATENT DOCUMENTS

| | | |
|---|---|---|
| Re. 27,145 | 6/1971 | Jones . |
| 3,231,635 | 1/1966 | Holden et al. . |
| 3,634,549 | 1/1972 | Shaw et al. . |
| 3,670,054 | 6/1972 | De La Mare . |
| 3,686,366 | 8/1972 | Winkler . |
| 3,700,633 | 10/1972 | Wald et al. . |
| 3,700,748 | 10/1972 | Winkler . |
| 4,663,220 | 5/1987 | Wisneski et al. .......... 428/221 |
| 4,764,572 | 8/1988 | Bean .......................... 526/87 |
| 4,835,200 | 5/1989 | St. Clair .................... 425/100 |
| 4,918,189 | 4/1990 | Ravichandran ........... 544/221 |
| 5,093,422 | 3/1992 | Himes ........................ 525/98 |
| 5,164,434 | 11/1992 | Liwak ........................ 524/100 |
| 5,194,530 | 3/1993 | Stevens et al. ............ 526/82 |
| 5,194,535 | 3/1993 | Koppes et al. ............ 526/181 |
| 5,249,741 | 10/1993 | Alper et al. ............... 525/95 |
| 5,302,463 | 4/1994 | Murata ...................... 428/517 |
| 5,378,543 | 1/1995 | Murata ...................... 428/517 |

FOREIGN PATENT DOCUMENTS 0 254 346 A2  1/1988  European Pat. Off. .

*Primary Examiner*—Fred Zitomer
*Attorney, Agent, or Firm*—Beverlee G. Steinberg

[57] ABSTRACT

A thermoplastic elastomer composition comprising a block copolymer having at least two resinous endblocks and a high 1,2-addition butadiene midblock, a paraffin oil and a crystalline polyolefin. The composition exhibits greater softness, better processability and better elastic properties as compared with similar compositions made with normal amounts of a 1,2-addition. Compositions are useful for utilities such as overmolding into hard substrates, grips, medical tubing and miscellaneous rubbery articles.

19 Claims, No Drawings

HIGH 1,2 CONTENT THERMOPLASTIC ELASTOMER/OIL/POLYOLEFIN COMPOSITION

This application is a continuation-in-part of U.S. patent application Ser. No. 08/675,637, filed Jul. 3, 1996, now abandoned.

BACKGROUND OF THE INVENTION

This invention relates to thermoplastic elastomer compositions containing oil and a polyolefin.

It is well known to incorporate olefin polymers into thermoplastic elastomer compositions to improve processability and to otherwise enhance the mechanical and chemical properties. For instance, high melting olefin polymers such as polypropylene improve the upper service temperature and ozone resistance of the compositions. It is also known to use paraffinic oils, alone or in combination with olefin polymers, to soften thermoplastic elastomer compositions and also to improve processability. However, increasing the amount of oil is a limited option because, at high oil levels, oil migration occurs which results in surface tackiness.

In many utilities, however, greater softness would be desirable.

SUMMARY OF THE INVENTION

It is an object of this invention to provide thermoplastic elastomers having greater softness; and It is yet a further object of this invention to provide thermoplastic elastomers with lower hardness and improved melt flow without an increase in the amount of oil.

In accordance with this invention, a high 1,2-content butadiene/monovinyl aromatic block copolymer elastomer is combined with a paraffinic oil and an olefin polymer.

DESCRIPTION OF THE PREFERRED EMBODIMENTS

Surprisingly, it has been found that the use of high 1,2-addition (high vinyl) thermoplastic elastomer in a rubber/oil/polyolefin composition results in greater softness as compared with similar compositions using elastomers where the 1,2-addition is in the usual 18 to 50 mole percent range. Furthermore, these novel compositions also have improved processability and better elastic properties as measured by, for instance, by compression set.

Thermoplastic Elastomer

By thermoplastic elastomer is meant a block copolymer having at least two end-blocks made of polymerized monovinyl aromatic compound, thus giving a glassy, aromatic segment, and a mid-block made up at least predominantly of polymerized 1,3-butadiene monomer, thus giving an amorphous elastomeric segment. The copolymers can be linear, A-B-A, radial, $(A-B)_nX$, or mixtures thereof Some A-B diblock polymer can be present but preferably at least 70 weight percent of the block copolymer is A-B-A or radial (or otherwise branched so as to have 2 or more terminal resinous blocks per molecule) so as to impart strength. Generally, 80 to 100 weight percent of the block copolymer has 2 or more terminal resinous blocks per molecule and it is preferred to have essentially no diblock. In the above radial formula the n is an integer of at least 3, generally 3 to 50, more generally 6 to 13, and the X is the remnant of a coupling agent.

The A-B-A compositions can be made by either sequential polymerization or coupling. In the sequential polymerization technique, the monovinyl aromatic monomer is first introduced to produce an aromatic block followed by the introduction of the butadiene monomer to produce the rubbery midblock followed by additional monovinyl aromatic compound to produce the other terminal aromatic block. This is broadly disclosed in Holden, U.S. Pat. No. 3,231,635 (Jan. 25, 1966), the disclosure of which is hereby incorporated by reference. The production of such polymers and also radial polymers is broadly disclosed in Stevens et al, U.S. Pat. No. 5,194,530 (Mar. 16, 1993), the disclosure of which is hereby incorporated by reference. Another patent broadly disclosing the anionic polymerization of thermoplastic elastomers using an organo alkali metal initiator is Bean, U.S. Pat. No. 4,764,572 (Aug. 16, 1988), the disclosure of which is hereby incorporated by reference.

It is well known in the art to drive the polymerization toward the 1,2-addition of butadiene. Broadly, this can be done by utilizing an organic polar compound such as an ether, including cyclic ethers, polyethers and thioethers or an amine including secondary and tertiary amines. Preferred are chelating ethers and amines. By chelating ether is meant an ether having more than one oxygen as exemplified by the formula $R(OR')_m(OR'')_oOR$ where each R is individually selected from 1 to 8, preferably 2 to 3, carbon atom alkyl radicals; R' and R" are individually selected from 1 to 6, preferably 2 to 3, carbon atom alkylene radicals; and m and o are independently selected integers of 1–3, preferably 1–2. Examples of preferred ethers include diethoxypropane, 1,2-dioxyethane (dioxo) and 1,2-dimethyoxyethane (glyme). Other suitable materials include $CH_3$—$OCH_2$—$CH_2$—$OCH_2$—$CH_2$—$OCH_3$ (diglyme) and $CH_3$—$CH_2$—$OCH_2$—$CH_2$—$OCH_2$—$CH_2$—$OCH_2$—$CH_3$. By chelating amine is meant an amine having more than 1 nitrogen such as N,N,N',N'-tetramethylethylene diamine. Monoamines are operable but less preferred. Less preferred also (but still operable) are straight chain and cyclic monoethers such as dimethylether, diethylether, anisole, and tetrahydrofuran.

This microstructure promoter is used in an amount of at least 0.1 moles per mole of lithium compound, preferably 1–50, more preferably 2–25, moles of promoter per mole of the lithium compound. Alternatively, the concentration can be expressed in parts per million by weight based on the total weight of solvent and monomer. Based on this criteria from 10 parts per million to about 1 weight percent, preferably 100 parts per million to 2000 parts per million are used. This can vary widely, however, since extremely small amounts of some of the preferred promoters are very effective. At the other extreme, particularly with less effective promoters, the promoter itself can be the solvent. Again, these techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al , U.S. Pat. No. 5,194,535 (Mar. 16, 1993), the disclosures of which are hereby incorporated by reference.

The resulting vinyl content for the polymers useful in this invention is greater than 50 mole percent, preferably 56–90, more preferably 65–90, most preferably 65–80.

The thermoplastic elastomer as it is actually used in this invention is hydrogenated and hence there is little or no vinyl unsaturation left. Nonetheless, it is still a high 1,2 addition polymer (from a high vinyl precursor). Even the hydrogenated product may be loosely referred to as "high vinyl" because of its origin.

The thermoplastic elastomers utilized in the compositions of this invention are selectively hydrogenated so as to remove most of the vinyl unsaturation and any ethylenic unsaturation in the polymer backbone from the monomer which did not polymerize in the 1,2 manner. By selective hydrogenation is meant that the aliphatic unsaturation is significantly removed while leaving unaffected most of the aromatic unsaturation. Suitable known catalysts for accomplishing this include nickel compounds in combination with a reducing agent such as an aluminum alkyl. Hydrogenation is taught in Shaw, U.S. Pat. No. 3,634,549 (Jan. 11, 1972), De la Mare, U.S. Pat. No. 3,670,054 (Jun. 13, 1972), Wald et al, U.S. Pat. No. 3,700,633 (Oct. 24, 1972) and Jones, Re 27,145 (Jun. 22, 1971), the disclosures of which are hereby incorporated by reference.

Each individual aromatic endblock must have a molecular weight of at least about 20,000. Preferably the endblocks have a molecular weight within the range of 20,000 to 50,000, more preferably 25,000 to 40,000, most preferably 25,000 to 37,000.

The thermoplastic elastomers utilized in this invention have a total molecular weight which is relatively high compared with thermoplastic elastomers in general. The molecular weight will generally be at least 130,000. For linear A-B-A polymers, the molecular weight will generally be within the range of 150,000 to 300,000. Actually, the upper limit is dictated by viscosity considerations and can be as high as can be tolerated and still be processable. The most preferred molecular weight for linear A-B-A polymers is 180,000 to 250,000. With radial polymers, the molecular weight can be much higher since these polymers have a lower viscosity for a given total molecular weight. Thus, for radial polymers the molecular weight generally will be in the range of 130,000 to 1 million, preferably 130,000 to 500,000.

The total monovinyl aromatic content of the block copolymer will generally be within the range of 20 to 48 weight percent based on the total weight of the block copolymer, preferably 22 to 45, more preferably 25 to 35 weight percent. The upper limit is set by the maximum which can be tolerated such that the material is still elastomeric as opposed to resinous. At about 50 weight percent and higher the material is resinous.

Since the block copolymers utilized in this invention are hydrogenated to remove the aliphatic unsaturation as noted hereinabove, they can be viewed as S-EB-S polymers, the S referring to the monovinyl aromatic generally styrene, endblocks. The EB represents ethylene/butylene which is the structure resulting from the hydrogenation of polymerized 1,3-butadiene.

Oil

The oil is one which is compatible with the elastomeric mid-block segment of the elastomeric block copolymer and which does not tend to go into the aromatic endblock portions to any significant degree. Thus, the oils can be viewed as paraffinic. Paraffinic oils which may be used in the elastomeric composition should be capable of being melt processed with other components of the elastomeric composition without degrading. Particularly important is the ability of the final composition to be melt extruded. An exemplary processing oil is a white mineral oil available under the trade designation DRAKEOL® 34 from the Pennzoil Company, Pennreco Division. DRAKEOL® 34 has a specific gravity of 0.864–0.878 at 60° F., a flashpoint of 460° F., and a viscosity of 370–420 SUS at 100° F. Suitable vegetable oils and animal oils or their derivatives may also be used as the processing oil. Suitable oils also include hydrogenated materials, i.e. hydrogenated naphthenics. Hydrogenated materials which were initially aromatic in nature are hydrogenated to the point where they exhibit no significant levels of aromatic unsaturation or at most, very low levels.

Polyolefin

The polyolefins utilized in this invention are crystalline polyolefins. That is, polyolefins having a crystallinity of at least 50% (i.e. at least 50 weight percent is crystalline). Most preferred are high density polyethylene, which has a crystallinity of about 80 to 90%, and crystalline polypropylene, the crystalline polypropylene being most preferred in many applications because of the improved high temperature properties it imparts. Other suitable polyolefins include polybutene, ethylene/higher α-olefin copolymers, propylene copolymers and butylene copolymers or mixtures of any of the above-described polyolefins. Most preferred is an injection molding grade crystalline polypropylene such as Polypropylene 5A15 homopolymer (melt flow rate 5 g/10 min., from Shell Chemical Co.).

Compounding

The thermoplastic elastomers of this invention may be viewed as comprising a hydrocarbon component made up of the elastomeric block copolymer, the paraffinic oil and the crystalline polyolefin. To this hydrocarbon component can be added other ingredients such as typically found in elastomeric compositions.

Other ingredients which do not affect the essential elastomeric characteristics of the composition may be present including pigments, fragrances, stabilizers, flame retardants, surfactants, waxes, flow promoters, solvents, and materials added to enhance processability and pellet handling of the composition. The compositions can also contain 5 to 40 weight percent based on the weight of hydrocarbon component of a filler such as a hard inorganic mineral filler.

The stabilizer can be any conventional stabilizer or stabilizer system and is frequently simply an antioxidant such as a hindered phenol. Particularly preferred is IRGANOX® 1010 alone or in combination with a thiosynergist such as DLTDP. IRGANOX® 1010 is tetrakis|methylene(3,5 -di-t-butyl-4-hydroxyhydrocinnamate)] methane. DLTDP is dilaurylthiodipropionate. Suitable stabilizers are shown in Alper et al, U.S. Pat. No. 5,149,741 (Sep. 22, 1992) and St. Clair, U.S. Pat. No. 4,835,200 (May 30, 1989), the disclosures of which are herein incorporated by reference. More volatile materials such as 2,6-di-tert-butylphenol are less preferred because of the volatility.

The stabilizer present is generally present in an amount within the range of 0.01 to 4, preferably 0.5 to 1 weight percent based on the weight of the base composition.

The compositions of this invention may be thought of in terms of (a) a base composition comprising
   (i) the elastomeric block copolymer,
   (ii) the oil,
   (iii) the crystalline polyolefin, and
(b) the other ingredients.

The base composition comprises 15 to 55, preferably 25 to 50, more preferably, 25 to 45 weight percent of the hydrogenated high 1,2 elastomeric block copolymer; 5 to 80 preferably 25 to 60, more preferably 35 to 60 weight percent of said paraffinic oils; and 5 to 20, preferably 5 to 15, more preferably 10 to 15 weight percent of the crystalline polyolefin. All of the percentages are based on the total weigh of the base composition, i.e. the block copolymer, oil and polyolefin.

The ingredients preferably are compounded by contacting the block copolymer with the oil and allowing time for the oil to be absorbed into the copolymer. Generally, the copolymer will absorb the oil to the appearance of dryness. Thereafter the oil/block copolymer composition is generally dry blended in a tumble blender with the polyolefin and antioxidant after which the blend is rendered molten and extruded.

Definitions

As used herein, the terms "tensile strength" or "TS" refer to the resistance of an elastic material to being elongated as determined in accordance with ASTM D-412 using 0.125 inch wide and 0.080 inch thick dumbbell samples that are cut from inspection molded plaques. Tensile testing is performed on an INSTRON® Model 1123 Universal Test Machine utilizing a crosshead speed of 10 inch/min.

As used herein, the terms "elongation" or "Eb" refer to the percent extension of an elastic material until breakage as determined in accordance with ASTM-D-412 as described above. A mechanical extensiometer is used during the testing to obtain a more accurate elongation. The gap distance for the extensiometer is 1 inch.

As used herein, the terms "compression set" or "CS" refer to a value determined according to ASTM-D-395, Method A, Type I. Disks of 1 inch diameter are cut out of injection molded plaques. These disks are stacked to approximately 0.5 inches in height and compressed between two flat chrome plates. The degree of compression is controlled by the use of standard metal spacers. The disk stacks are placed under compression for 22 hours at room temperature or 70° C., and then allowed to recover for 30 minutes before their final thickness is measured.

As used herein, the term "hardness" refers to a value determined according to ASTM D2240 after 10 seconds of resistance on the Shore A hardness scale. The hardness value is the average of five measurements taken at different locations around a 4 inch by 5 inch injection molded plaque.

As used herein the melt flow index ("MFI") is an indication of melt viscosity determined according to ASTM D1238 Procedure A at a temperature of 230° C. and 2.16 kg piston loading (Old Condition L). The procedure utilizes a dead-weight piston plastometer.

By "molecular weight" as used herein is meant the following. Molecular weights of linear block copolymer are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodispersed and it is both convenient and adequately descriptive to report the "peak" molecular weight of the narrow molecular weight distribution observed. Hence, this is what is meant with regard to references herein to molecular weight of linear polymers. This is also what is meant with regard to references herein to molecular weight of linear polymers. This is also what is meant by the references herein to the molecular weight of the aromatic resinous A block. Polystyrene is used to calibrate, thus directly giving the absolute molecular weight of polystyrene endblocks. From this and the known percent styrene, the absolute molecular weight of the midblock is calculated. That is, an aliquot is removed after the first step of the polymerization, terminated to deactivate the initiator and the molecular weight measured.

Measurement of the true molecular weight of final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration less than 1.0 gram of sample per 100 millimeters of solvent and filtered using a syringe and porous membrane filters of less than 0.5 microns pore size directly onto the light scattering cell. The light scattering measurements are performed as a function of scattering angle and of polymer concentration using standard procedures. The differential refractive index (DRI) of the sample is measured at the same wavelength and in the same solvent used for the light scattering. Thus, the reference to molecular weight in reference to final star or radial polymers means molecular weight determined in this fashion. However, even with the star polymers, the endblocks are still measured by taking an aliquot and using GPC as described for the linear polymers.

Example

In the following example polymers of high and normal vinyl content were utilized. The high vinyl content blends, designated "A," "C," "D," "E," "F," "G," and "H," were produced as follows. Utilizing the conventional secondary butyllithium initiator, styrene, then 1,3-butadiene, then styrene were sequentially introduced to give an A-B-A polymer. Polymerization of the butadiene segment was carried out at 50° C. and cyclohexane solvent utilizing 300 parts per million based on the weight of solvent and monomer of glyme so as to induce high 1,2-addition. The resulting polymers had 1,2-additions as shown in Table 1. The polymers were then hydrogenated utilizing a conventional nickel/aluminum hydrogenation catalyst to give the S-EB-S structure.

Polymer "B" was a sequentially polymerized polymer prepared in a similar manner except glyme was not utilized, instead 6 weight percent diethylether, based on the weight of solvent and monomer, was used. The polymer was hydrogenated in the same manner as Polymer A.

TABLE 1

| STYRENIC BLOCK COPOLYMERS | | | |
|---|---|---|---|
| Blend | MW (S, EB, S) (×1,000) | Polystyrene Content (% w) | 1,2-addition of Butadiene (% mol) |
| A | 25-145-37 | 30 | 75.2 |
| B | 29-123-29 | 32 | 38 |
| C | 26-131-26 | 28.1 | 71 |
| D | 25-93-39 | 35.3 | 77 |
| E | 29-117-32 | 32.9 | 69.4 |
| F | 29-116-31 | 32.9 | 72.1 |
| G | 30-120-34 | 32.8 | 72.3 |
| H | 29-118-32 | 32.5 | 72.5 |

Three aliquots of conventional Polymer B and four aliquots of the high vinyl Polymers were separately compounded with various amounts of oil and polyolefin as set out in Table 2. Compounding was carried out by contacting the oil and the block copolymer and allowing 8 hours for absorption of the oil into the block copolymer. Thereafter the composition was tumbled with the polyolefin for 15 minutes and then extruded at a temperature of 225° C. From this extrudate tensile specimens and compression set specimens were molded and the melt flow determined. The results are set out in Table 2.

TABLE 2

BLENDS

| Blend # | SBC[1] | SBC (% w) | Oil[2] (% w) | PP[3] (% w) | Hardness (Shore A) | TS (RT) (psi) | Eb (RT), (%) | TS (70) (psi) | Eb (70) (%) | CS (70) (%) | MFI (230/2.16) (g/10 min) |
|---|---|---|---|---|---|---|---|---|---|---|---|
| 8  | C | 30 | 50 | 20 | 53.1/46.7 | 650 | 769 |     |     | 46.1 | 26.5 |
| 9  | D | 30 | 50 | 20 | 56.5/51.4 | 688 | 736 |     |     | 57.8 | 45.7 |
| 1  | A | 40 | 50 | 10 | 28.6/23.1 | 506 | 800 | 121 | 507 | 49.6 | 3.15 |
| 2  | B | 40 | 50 | 10 | 35.9/31.3 | 802 | 831 | 190 | 720 | 56.5 | 1.23 |
| 10 | E | 45 | 45 | 10 | 34.8/29.4 | 616 | 721 |     |     | 34.2 | 0.16 |
| 11 | C | 45 | 45 | 10 | 31.3/25.3 | 607 | 693 |     |     | 35.1 | 0.57 |
| 12 | F | 45 | 45 | 10 | 32.9/27.5 | 545 | 616 |     |     | 32.4 | 0.4 |
| 13 | G | 45 | 45 | 10 | 34.3/29.0 | 566 | 596 |     |     | 34.1 | 0.12 |
| 14 | H | 45 | 45 | 10 | 33.7/28.9 | 553 | 593 |     |     | 32.2 | 0.23 |
| 3  | A | 45 | 45 | 10 | 30.0/22.5 | 583 | 978 | 115 | 583 | 46   | 2.56 |
| 4  | A | 45 | 45 | 10 | 31.6/25.4 | 559 | 991 | 121 | 535 |      | 1.76 |
| 15 | D | 45 | 45 | 10 | 30.1/25.2 | 685 | 814 |     |     | 50.6 | 5 |
| 5  | B | 45 | 45 | 10 | 41.5/36.5 | 742 | 706 | 183 | 613 | 58.7 | 0.1 |
| 6  | A | 55 | 35 | 10 | 39.3/33.1 | 592 | 851 | 160 | 573 | 50.9 | <0.06 |
| 7  | B | 55 | 35 | 10 | 49.3/45.8 | 782 | 628 | 292 | 677 | 60   | <0.01 |

[1]Styrenic Block Copolymer (SBC)
[2]DRAKEOL ® 34
[3]Polypropylene sold under the trade designation 5A15 from Shell Oil Company As can be seen comparing the similar blends, significantly lower hardness (greater softness) was obtained with the high-vinyl SBCs as compared with the comparable Control SBC (B). As can be seen further, this was achieved with better set, the lower number indicating better elasticity, i.e. less permanent deformation. Finally, a comparison of the melt flow index shows that all of these beneficial results were obtained with an improvement rather than a sacrifice in melt flow.

Similarly, a comparison of the blends at slightly lower oil ratios shows the same lower hardness (better softness), and the same improvement in compression set and melt flow.

While this invention has been described in detail for the purpose of illustration, it is not to be construed as limited thereby but is intended to cover all changes and modifications within the spirit and scope thereof

I claim:

1. A thermoplastic elastomer composition comprising:
   (a) a base composition comprising:
      (i) 15 to 55 weight percent of a block copolymer having at least two resinous polymerized monovinyl aromatic endblocks and a midblock of hydrogenated polymerized butadiene wherein at least 51 mole percent of said butadiene has polymerized at the 1,2-position,
      (ii) 5 to 80 weight percent of a paraffinic oil, and
      (iii) 5 to 20 weight percent of a crystalline polyolefin; and
   (b) a stabilizer, such stabilizer being present in an amount within the range of 0.01 to 4 weight percent based on the weight of said base composition.

2. A composition according to claim 1 wherein said end-blocks each have a molecular weight of at least 20,000 and wherein said block copolymer has a molecular weight of at least 130,000.

3. A composition according to claim 2 wherein said block copolymer comprises 20-48 weight percent of said monovinyl aromatic compound.

4. A composition according to claim 3 wherein said block copolymer is an A-B-A block copolymer wherein each A represents polymerized styrene and wherein said crystalline polyolefin is polypropylene, said block copolymer further being defined by a molecular weight within the range of 180,000-250,000.

5. A composition according to claim 4 wherein said block copolymer has a styrene content within the range of 25-35 weight percent.

6. A composition according to claim 1 wherein said block copolymer is an A-B-A block copolymer having a molecular weight within the range of 150,000-300,000.

7. A composition according to claim 1 wherein said block copolymer has a monovinyl aromatic content within the range of 22-45 weight percent.

8. A composition according to claim 1 wherein said monovinyl aromatic compound is styrene.

9. A composition according to claim 1 wherein said polyolefin is polypropylene.

10. A composition according to claim 1 wherein said block copolymer has a monovinyl aromatic content within the range of 25-35 weight percent.

11. A composition according to claim 1 wherein said stabilizer comprises a hindered phenol antioxidant and a thiosynergist.

12. A composition according to claim 11 wherein said hindered phenol is tetrakis|methylene(3,5-di-t-butyl-4-hydroxyhydrocinnaniate)| methane and said thiosynergist is dilaurylthiodipropionate.

13. A composition according to claim 1 comprising in addition a flame retardant.

14. A composition according to claim 1 comprising in addition a filler.

15. A composition according to claim 1 wherein said oil is a white mineral oil having a specific gravity within the range of 0.864–0.878 at 60° C. and a viscosity of 370–420 sus at 100° F. and wherein said polyolefin is polypropylene.

16. A composition comprising 25 to 45 weight percent of a styrene-ethylenebutylene-styrene block copolymer wherein at least 51 mole percent of said butylene block is derived from 1,2-butadiene polymerization; 35 to 60 weight percent of a paraffinic oil; and 10 to 15 weight percent of a crystalline polyolefin.

17. A composition according to claim 16 wherein said ethylene-butylene block is derived from butadiene in which 65-80 mole percent polymerized at the 1,2 position.

18. A process comprising:
   combining a block copolymer having at least two resinous polymerized monovinyl aromatic compound endblocks and a midblock of hydrogenated polymerized butadiene wherein at least 51 mole percent of said butadiene has polymerized at the 1,2-position with a paraffinic oil;

allowing time for said block copolymer to absorb said paraffinic oil to give an oil-containing block copolymer composition;

tumble blending said oil-containing block copolymer composition with a crystalline polyolefin to give a block copolymer/oil/polyolefin mixture;

melt extruding said mixture, wherein said block copolymer is present in an amount within the range of 15 to 55 weight percent, said oil is present in an amount within the range of 5 to 80 weight percent, and said crystalline polyolefin is present in an amount within the range of 5 to 20 weight percent based on the total weight of said block copolymer, oil and polyolefin.

19. A method according to claim 18 wherein said monovinyl aromatic compound is styrene, said block copolymer is of a linear A-B-A configuration, 65–80 mole percent of said butadiene has polymerized at the 1,2-position, and wherein said block copolymer is present in an amount within the range of 25 to 45 weight percent, said oil is present in an amount within the range of 35 to 60 weight percent and said crystalline polyolefin is poly-propylene present in an amount within the range of 10 to 15 weight percent, and wherein a stabilizer is also present during said tumble blending.

* * * * *